United States Patent
Aldweik et al.

(10) Patent No.: US 12,381,829 B2
(45) Date of Patent: Aug. 5, 2025

(54) DROPPED-PACKETS REPAIR AND RECOVERY FOR DELAY-TOLERANT WIRELESS SYSTEMS USING RETROACTIVE INTERFERENCE CANCELLATION

(71) Applicant: Khalifa University of Science and Technology, Abu Dhabi (AE)

(72) Inventors: Arafat Aldweik, Abu Dhabi (AE); Youssef Iraqi, Abu Dhabi (AE); Ashfaq Ahmed, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 293 days.

(21) Appl. No.: 18/312,483

(22) Filed: May 4, 2023

(65) Prior Publication Data
US 2023/0379262 A1    Nov. 23, 2023

Related U.S. Application Data

(60) Provisional application No. 63/343,500, filed on May 18, 2022.

(51) Int. Cl.
| | |
|---|---|
| *H04J 11/00* | (2006.01) |
| *H04L 1/18* | (2023.01) |
| *H04L 47/32* | (2022.01) |
| *H04L 47/34* | (2022.01) |

(52) U.S. Cl.
CPC ........... *H04L 47/34* (2013.01); *H04L 1/18* (2013.01); *H04L 47/32* (2013.01)

(58) Field of Classification Search
CPC ....... H04L 1/18; H04L 1/1822; H04L 1/1845; H04L 47/32; H04L 47/34
See application file for complete search history.

(56) References Cited

U.S. PATENT DOCUMENTS

| | | | |
|---|---|---|---|
| 2002/0114401 A1* | 8/2002 | Kim | H03M 13/6362 375/295 |
| 2004/0196780 A1* | 10/2004 | Chin | H04B 7/2628 370/335 |
| 2005/0276249 A1* | 12/2005 | Damnjanovic | H04L 1/1841 370/335 |

(Continued)

OTHER PUBLICATIONS

G. Forecast et al., "Cisco visual networking index: global mobile data traffic forecast update, 2017-2022," Cisco, Tech. Rep., 2019.

(Continued)

*Primary Examiner* — Phuc H Tran
(74) *Attorney, Agent, or Firm* — Kilpatrick Townsend & Stockton LLP (57) ABSTRACT

A method can be implemented by a first device. A first data sequence can be received and can include a first data packet and a second data packet. It can be determined that first detection of the first data packet from the first data sequence is erroneous. The first data sequence can be stored as a first buffered data sequence in a memory buffer. A second data sequence that includes the second data packet and that excludes the first data packet can be received. The second data packet can be detected from the second data sequence. The first data packet can be detected based on the first buffered data sequence and the second data packet.

20 Claims, 8 Drawing Sheets

(56) References Cited

U.S. PATENT DOCUMENTS

| | | | | |
|---|---|---|---|---|
| 2007/0147250 | A1* | 6/2007 | Druke | H04L 1/1854 370/428 |
| 2009/0319845 | A1* | 12/2009 | Liu | H03M 13/3761 370/312 |
| 2012/0110405 | A1* | 5/2012 | Toshimitsu | H04L 1/1635 370/242 |
| 2020/0028640 | A1* | 1/2020 | Yeo | H04L 5/0007 |
| 2024/0172248 | A1* | 5/2024 | Jang | H04L 1/1896 |

OTHER PUBLICATIONS

E. Dosti, M. Shehab, H. Alves, and M. Latva-Aho, "Ultra reliable communication via optimum power allocation for HARQ retransmission schemes," IEEE Access, vol. 8, pp. 89 768-89 781, 2020.

V. W. Wong, R. Schober, D. W. K. Ng, and L.-C. Wang, Key Technologies for 5G Wireless Systems. Cambridge University Press, 2017.

A. Ahmed, A. Al-Dweik, Y. Iraqi, H. Mukhtar, M. Naeem, and E. Hossain, "Hybrid automatic repeat request (HARQ) in wireless communications systems and standards: A contemporary survey," IEEE Commun. Surveys Tuts., vol. 23, No. 4, pp. 2711-2752, 2021.

A. Ahmed, M. Naeem, and A. Al-Dweik, "Joint optimization of sensors association and UAVs placement in IoT applications with practical network constraints," IEEE Access, vol. 9, pp. 7674-7689, 2021.

Y. Su, Y. Liu, Y. Zhou, J. Yuan, H. Cao, and J. Shi, "Broadband LEO satellite communications: Architectures and key technologies," IEEE Wireless Commun., vol. 26, No. 2, pp. 55-61, 2019.

M. Aldababsa, C. Goztepe, G. K. Kurt, and O. Kucur, "Bit error rate for NOMA network," IEEE Commun. Lett., vol. 24, No. 6, pp. 1188-1191, 2020.

T. Assaf et al., "Efficient bit loading algorithm for OFDM-NOMA systems with BER constraints," IEEE Trans. Veh. Technol., pp. 1-1, 2021.

"Exact bit error-rate analysis of two-user NOMA using QAM with arbitrary modulation orders," IEEE Commun. Lett., vol. 24, No. 12, pp. 2705-2709, 2020.

D. Cai, Y. Xu, F. Fang, Z. Ding, and P. Fan, "On the impact of time-correlated fading for downlink NOMA," IEEE Trans. Commun., vol. 67, No. 6, pp. 4491-4504, 2019.

H. Yahya, A. Al-Dweik, and E. Alsusa, "Power-tolerant NOMA using data-aware adaptive power assignment for IoT systems," IEEE Internet Things J, vol. 8, No. 19, pp. 14 896-14 907, 2021.

B. Lyu, P. Ramezani, H. T. Dinh, and A. Jamalipour, "IRS-assisted downlink and uplink NOMA in wireless powered communication networks," IEEE Trans. Veh. Technol., pp. 1-1, 2021.

A. Al-Dweik et al., "Efficient NOMA design without channel phase information using amplitude-coherent detection," IEEE Trans. Commun., pp. 1-1, 2021.

D.-T. Do, A.-T. Le, Y. Liu, and A. Jamalipour, "User grouping and energy harvesting in UAV-NOMA system with AF/DF relaying," IEEE Trans. Veh. Technol., vol. 70, No. 11, pp. 11 855-11 868, 2021.

Y. Iraqi and A. Al-Dweik, "Power allocation for reliable SIC detection of rectangular QAM-based NOMA systems," IEEE Trans. Veh. Technol., vol. 70, No. 8, pp. 8355-8360, 2021.

M. Wu, Q. Song, L. Guo, and A. Jamalipour, "Joint user pairing and resource allocation in a SWIPT-enabled cooperative NOMA system," IEEE Trans. Veh. Technol., vol. 70, No. 7, pp. 6826-6840, 2021.

H. Yahya, E. Alsusa, and A. Al-Dweik, "Exact BER analysis of NOMA with arbitrary number of users and modulation orders," IEEE Trans. Commun., vol. 69, No. 9, pp. 6330-6344, 2021.

A. Al-Dweik and Y. Iraqi, "High throughput wireless links for time-sensitive WSNs with reliable data requirements," IEEE Sensors J., vol. 21, No. 21, pp. 24 890-24 898, 2021.

D. Cai, Z. Ding, P. Fan, and Z. Yang, "On the performance of NOMA with hybrid ARQ," IEEE Trans. Veh. Technol., vol. 67, No. 10, pp. 10 033-10 038, 2018.

Y. Xu, D. Cai, F. Fang, Z. Ding, C. Shen, and G. Zhu, "Outage analysis and power allocation for HARQ-CC enabled NOMA downlink transmission," in IEEE Global Commun. Conf., 2018, pp. 1-6.

Z. Xiang, W. Yang, G. Pan, Y. Cai, Z. Ding, and Y. Zou, "An HARQ assisted cognitive NOMA scheme for secure transmission with imperfect SIC," IEEE Trans. Commun., vol. 69, No. 3, pp. 1930-1946, 2021.

J. Choi, "H-ARQ based non-orthogonal multiple access with successive interference cancellation," in IEEE Global Commun. Conf., 2008, pp. 1-5.

Z. Yu, C. Zhai, W. Ni, and D. Wang, "Non-orthogonal multiple access with cooperative truncated ARQ and relay selection," IEEE Access, vol. 7, pp. 56 228-56 243, 2019.

F. Cao, Y. Song, and Y. Yang, "ARQ assisted short-packet communications for NOMA networks over Nakagami-m fading channels," IEEE Access, vol. 8, pp. 158 263-158 272, 2020.

R. Kotaba, C. N. Manchon, N. M. K. Pratas, T. Balercia, and p. Popovski, "Improving spectral efficiency in URLLC via NOMA-based retransmissions," in IEEE Intl. Conf. Commun., 2019, pp. 1-7.

Z. Shi, C. Zhang, Y. Fu, H. Wang, G. Yang, and S. Ma, "Achievable diversity order of HARQ-aided downlink NOMA systems," IEEE Trans. Veh. Technol., vol. 69, No. 1, pp. 471-487, 2020.

R. Chandran and S. R. Pal, "A novel retransmission scheme for HARQ enhancement in NOMA based LTE systems," in IEEE Wireless Commun. Netw. Conf., 2019, pp. 1-5.

D. Marasinghe, N. Rajatheva, and M. Latva-Aho, "Block error performance of NOMA with HARQ-CC in finite blocklength," in IEEE Intl. Conf. Commun. Workshops, 2020, pp. 1-6.

H. Yahya, A. Al-Dweik, Y. Iraqi, E. Alsusa, and A. Ahmed, "A Power and Spectrum Efficient Uplink Transmission Scheme for QoS-Constrained IoT Networks," IEEE Internet Things J., Sep. 2021. [Online]. https://www.techrxiv.org/articles/preprint/A_Power_and_Spectrum_Efficient_Uplink_Transmission_Scheme_for_QoS-Constrained_IoT_Networks/16653028.

A. J. Al-Dweik, M. Mayhew, R. Muresan, S. M. Ali, and A. Shami, "Using technology to make roads safer: Adaptive speed limits for an intelligent transportation system," IEEE Veh. Technol. Mag., vol. 12, No. 1, pp. 39-47, 2017.

L. Yang, R. Muresan, A. Al-Dweik, and L. J. Hadjileontiadis, "Image-based visibility estimation algorithm for intelligent transportation systems," IEEE Access, vol. 6, pp. 76 728-76 740, 2018.

G. R. W. Thoms, R. Muresan, and A. Al-Dweik, "Chaotic encryption algorithm with key controlled neural networks for intelligent transportation systems," IEEE Access, vol. 7, pp. 158 697-158 709, 2019.

V. M. Lidkea, R. Muresan, and A. Al-Dweik, "Convolutional neural network framework for encrypted image classification in cloud-based ITS," IEEE Open J. Intell. Transp. Syst., vol. 1, pp. 35-50, 2020.

R. Tamanani, R. Muresan, and A. Al-Dweik, "Estimation of driver vigilance status using real-time facial expression and deep learning," IEEE Sensors Lett., vol. 5, No. 5, pp. 1-4, 2021.

* cited by examiner

Packet drop rate for different L and α values, with and without PRR.

FIG. 6

Successfully recovered packets after PRR.

Average and maximum drop buffer occupancy for α = 0.8.

DROPPED-PACKETS REPAIR AND RECOVERY FOR DELAY-TOLERANT WIRELESS SYSTEMS USING RETROACTIVE INTERFERENCE CANCELLATION

CROSS-REFERENCES TO RELATED APPLICATIONS

This application claims priority to U.S. Provisional Application No. 63/343,500 filed May 18, 2022, the entire contents of which is hereby incorporated for all purposes in its entirety.

BACKGROUND

Multimedia communications currently correspond to the major portion of traffic of wireless networks. For example, mobile video traffic accounted for 59% of the total mobile data traffic in 2017 and expected to reach 79% in 2022. For multimedia communications, particularly video, reliability, spectral utilization, power consumption and high data rate transmission requirements have emerged as key challenges. In particular scenarios, multimedia transmission may use ultra-reliable, low-latency communications (URLLC) services. Therefore, extensive research efforts are being devoted to enable beyond 5G (B5G) and 6th generation (6G) cellular networks to handle such challenging requirements.

SUMMARY

In some embodiments, a method can be used to perform a packet repair and recovery technique. The method can be implemented by a first device. At a first time, a first data sequence can be received that includes a first data packet and a second data packet. It can be determined that first detection of the first data packet from the first data sequence is erroneous. The first data sequence can be stored as a first buffered data sequence in a memory buffer based on the first detection being erroneous. Receiving a second data sequence that includes the second data packet and that excludes the first data packet can be received at a second time. The second data packet can be detected from the second data sequence. The first data packet can be detected based on the first buffered data sequence and the second data packet.

In some embodiments, a device can be used to perform a packet repair and recovery technique. The device can include one or more processors and one or more memory storing instructions that, upon execution by the one or more processors, configure the device to perform various operations. The device can receive, at a first time, a first data sequence that includes a first data packet and a second data packet. The device can determine that first detection of the first data packet from the first data sequence is erroneous. The device can store, in a memory buffer based on the first detection being erroneous, the first data sequence as a first buffered data sequence. The device can receive, at a second time, a second data sequence that includes the second data packet and that excludes the first data packet. The device can detect the second data packet from the second data sequence. The device can detect the first data packet based on the first buffered data sequence and the second data packet.

In some embodiments, a system can be used to perform a packet repair and recovery technique. The system can include a first device that can include one or more first processors and one or more first memory storing first instructions that, upon execution by the one or more first processors, configure the first device to perform various operations. The first device can receive, at a first time, a first data sequence that includes a first data packet and a second data packet. The first device can determine that first detection of the first data packet from the first data sequence is erroneous. The first device can store, in a memory buffer based on the first detection being erroneous, the first data sequence as a first buffered data sequence. The first device can receive, at a second time, a second data sequence that includes the second data packet and that excludes the first data packet. The first device can detect the second data packet from the second data sequence. The first device can detect the first data packet based on the first buffered data sequence and the second data packet.

DETAILED DESCRIPTION

Data download and storage over wireless networks may be a popular application for various multimedia such as image files, audio files, video files, and the like. In such applications, an end-user may listen to or watch the downloaded media in real-time, and/or may playback the downloaded file multiple times in the future. Improving the quality of the stored multimedia may be desirable by the end-user, even if the initial real-time version has less quality. Systems and methods can implement one or more techniques to improve the throughput of wireless networks that adopt nonorthogonal transmission and/or automatic repeat request (ARQ) protocols. The techniques involve storing the dropped data packets for further offline processing where some packets can be recovered by applying successive interference cancellation (SIC) in a retroactive manner. The techniques of the present disclosure, which may involve packet repair and recovery (PRR) operations, can improve the reliability of the received data without additional packet retransmission, which may offer a significant throughput gain. In some embodiments, the techniques may be applied to image transmission for transportation systems, online video streaming, satellite image recovery, and the like. Most or all of the dropped packets can be successfully recovered, and the visual quality of the received image can be improved using the techniques. In some embodiments, the results can illustrate that the PRR techniques can reduce the packet drop rate (PDR) from $10^{-1}$ to $10^{-3}$, i.e., 100 fold or more, which implies that 99% of the packets that were initially dropped may be successfully recovered.

Certain aspects and features of the present disclosure can be used to verify and improve the data reliability over wireless networks. In some examples, automatic repeat request (ARQ), or ARQ-type protocols, can be used to provide closed-loop error correction through a hand-shaking process between a transmitter and a receiver. ARQ can be used to provide a guaranteed reliability level, which may be different than forward error correction coding that may provide best-effort reliability. In some embodiments, ARQ may be based on repetitive transmission of packets that may not be detected successfully at the receiver. While ARQ alone may degrade the power and spectral efficiency of the system and increase the delay, a system such as one or more of the systems disclosed herein may provide reliability without degrading the power and the spectral efficiency. Moreover, the number of transmissions per packet may be limited to avoid severe delays, time jitter, power consumption and throughput deterioration.

Certain packets may be dropped if the packets are not successfully detected after a predetermined number of transmissions. The limitation on the number of allowed retransmissions might be determined by an application. For example, unmanned aerial vehicles (UAVs) may be used in various applications, such as the example illustrated in FIG. 1 for an intelligent transportation system (ITS). In such scenarios, the UAV may communicate data, images, or videos while moving, which makes it challenging to have a large number of retransmissions. A similar situation may apply for low-earth orbit (LEO) satellites. The impact of dropped packets depends on the application in use. In certain applications, an end-user may initiate the transmission process again, or the transmission will continue, but with a degraded quality.

In addition to reliable data transmission, spectrum scarcity may be another challenge for future wireless communications. The design of spectrally-efficient, multiple access schemes and signal designs can be used. In a particular example, non-orthogonal multiple access (NOMA) may be used and may be a potential solution to the spectrum scarcity problem. Similar to NOMA, non-orthogonal multiplexing (NOM) has the capability to improve the spectral efficiency for wireless systems by opportunistically exploiting good channel conditions to multiplex several data packets in the same transmission slot. NOMA may use ARQ to achieve a certain quality of service (QoS) provision, while NOM can be used for systems that incorporate ARQ.

NOMA-assisted, hybrid-ARQ (HARQ) can outperform orthogonal multiple access (OMA)-HARQ in terms of outage probability. Additionally, HARQ-CC with NOMA can provide a substantial gain in terms of outage probability. The performance of a cooperative network with NOMA-ARQ/HARQ error control methods can yield a throughput gain as compared to OMA transmission. Short-packet communications can be used to increase reliability. For example, a NOMA assisted ARQ system can be used for short-packet communications to ensure ultra-reliability and to increase throughput. A NOMA-assisted HARQ system for ultra-reliability can involve re-transmitting a packet such that the retransmitted packet and the new packet may share the channel resource, and the received packets may be combined to improve the effective signal to noise ratio (SNR). A dynamic power allocation scheme in a NOMA-HARQ based transmission scheme can lead to a reduced number of retransmissions.

In some embodiments, multimedia communications may be a time-sensitive application. For example, video streaming may not tolerate large time jitter or delay because that can significantly deteriorate the video quality. Similarly, UAVs and LEOs may be configured to send images and videos in a timely manner, for example in less than a few seconds. However, in some embodiments, the end-user (used herein to refer to, for example, a client device or more broadly a device) may save the received data for archiving, or for replaying at a later time. The multimedia files can be stored for archiving without immediate observation, as in the case of surveillance cameras. Storing multimedia contents in high quality may be desirable, even though the live version did not have the same high quality. When NOMA or NOM are integrated with ARQ, then a large number of packets can be correlated and recovered. The outcome detecting the ith packet may affect the detection of packets 1, 2, . . . , i−1 and packets i+1, i+2, . . . , M.

In some embodiments, a packet repair and recovery technique can be used to revive dropped packets in an off-line manner, and thus, improve the quality of the stored version of the received data. The packet repair and recovery technique can be performed by exploiting the correlation between the received packets due to the nonorthogonal transmission. The packet repair and recovery technique may not involve any new retransmission of any packet, and thus, it does not affect the system throughput, spectrum efficiency, or power efficiency. The packet repair and recovery technique can be applied to NOM and to NOMA. The performance of the packet repair and recovery technique can be evaluated in terms of the packet drop rate and buffering performance. Moreover, the packet repair and recovery technique can be tested for image transmission applications where the performance may be evaluated using the peak signal to noise ratio (PSNR) and visually based on the processed images. The packet repair and recovery technique can significantly reduce the number of dropped packets and improve the PSNR and the visual image quality.

Figure 1:
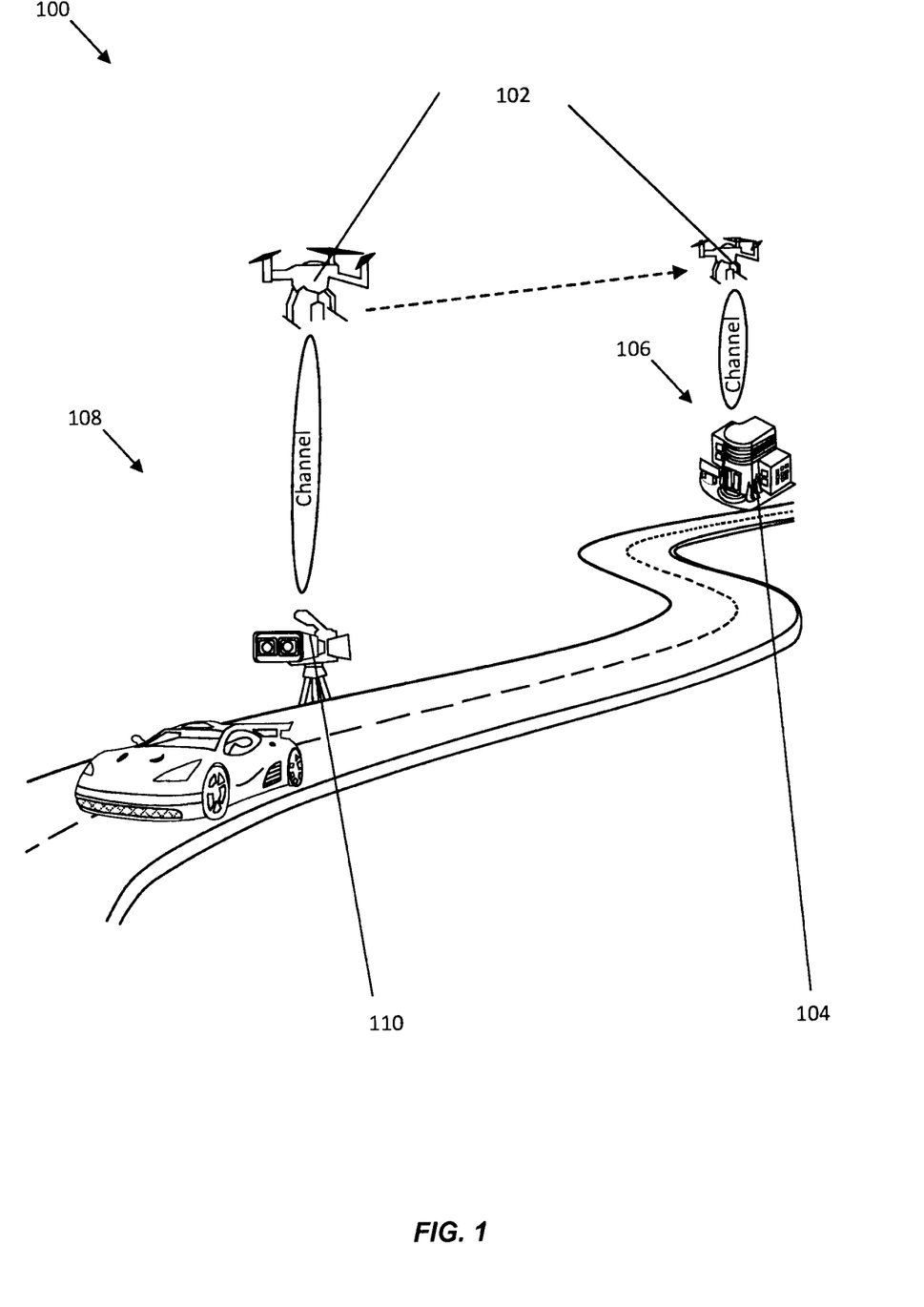
FIG. 1 is a diagram of a transmitter and a receiver that can use dropped-packets repair and recovery according to some embodiments.

FIG. 1 is a diagram 100 of a transmitter 102 and a receiver 104 that can use dropped-packets repair and recovery according to some embodiments. In some embodiments, the transmitter 102 may be a UAV, and the receiver 104 may be a computing device, for example positioned at a first location 106. The transmitter 102 may be mobile and may move, for example from a second location 108 to the first location 106 to transmit data. In some embodiments, the transmitter 102 may receive data from a sensor 110, and the transmitter 102 may, in turn, transmit the data to the receiver 104.

Generally, a transmitter 102 can be a device that includes a radio frequency (RF) chain or other communication chain (e.g., optics-based chain), one or more processors, and one or more memory storing instructions that, upon execution by the one or more processors, configure the transmitter 102 to perform various functionalities. These functionalities include the transmission of data via the RF chain (or any other communication chain). The transmitter 102 can also be configured to receive data (via the same or different RF/communication chain). In this case, the transmitter 102 can be referred to as a transceiver.

In comparison, a receiver 104 can be a device that includes a radio frequency (RF) chain or other communication chain (e.g., optics-based chain), one or more processors, and one or more memory storing instructions that, upon execution by the one or more processors, configure the receiver 104 to perform various functionalities. These functionalities include the reception of data via the RF chain (or any other communication chain). The receiver 104 can also be configured to transmit data (via the same or different RF/communication chain). In this case, the receiver 104 can be referred to as a transceiver.

An ARQ system may include the transmitter 102 that may transmit M packets to the receiver 104 through a wireless link, or through other suitable communication links, where each packet may include B bits. The transmitter 102 and the receiver 104 may communicate using a truncated ARQ with a stop-and-wait flow control protocol with a maximum number of transmissions of L, including the initial transmission. A packet that fails the error check following its L transmissions may be dropped. The channel between the transmitter 102 and receiver 104 may be modeled as a block fading channel. For example, the channel may remain constant during a single transmission session but may vary randomly over consecutive transmission sessions. The received sequence during the $\ell$th transmission session of packet i can be written as:

$$y_i^{(l)} = h_i^{(l)} \sqrt{p_i^{(l)} x_i^{(l)}} + w_i^{(l)}, \begin{cases} l \in \{1, 2, \ldots, L\} \\ l \in \{1, 2, \ldots, M\} \end{cases} \quad (1)$$

where p is the transmission power, the channel frequency responses (CFRs) $h_i^{(\ell)}, \forall \{i, \ell\}$ are independent and identically distributed, $h_i^{(\ell)} \sim \mathcal{CN}(0, \sigma_h^2)$, w is the additive white Gaussian noise (AWGN) vector, and w=[$w_1, w_2, \ldots, w_B$], $w_i^{(\ell)} \sim \mathcal{CN}(0, \sigma_w^2)$ are independent and identically distributed $\forall \{i, \ell\}$. The transmitted data packet may be or include $x_i=[x_{i,1}, x_{i,2}, \ldots, x_{i,B}]$ where the data symbols are selected from a particular constellation such as phase shift keying (PSK) or quadrature amplitude modulation (QAM).

The receiver 104 may detect the received sequence $y_i$ and may check its transmission counter $\ell$. If $\ell=1$, then $y_i$ may be detected to obtain the estimated version of $x_i$, which may be denoted as $\hat{x}_i$. The packet detection process may be denoted as $\hat{x}_i = \mathcal{D}_1\{y_i\}$, and the packet detection process can be performed by using maximum likelihood detection (MLD) for each symbol in the received sequence. The receiver 104 verifies if $x_i=\hat{x}_i$ using certain error detection techniques such as cyclic redundancy check (CRC) or other suitable error detection techniques. If the error detection technique indicates that $x_i=\hat{x}_i$, then an acknowledgment (ACK) can be sent by the receiver 104 to instruct the transmitter 102 to send packet $x_{i+1}$. Otherwise, a negative acknowledgment (NACK) may be sent by the receiver 104 to instruct the transmitter 102 to resend $x_i$. However, if $\ell>1$, chase combining (CC) can be used to combine $y_i^{(1)}$m, $y_i^{(2)}, \ldots y_i^{(\ell)}$, and then the combined sequence can be detected and remaining processes are similar to the case where $\ell=1$. The CC process in this case may be similar to the maximum ratio combining (MRC).

Packet correlation can be experienced in NOMA, NOM, and generalized NOM (GNOM) systems. However, low complexity NOM, in which the number of combined packets per transmission slot $N=2\forall \ell$, can be used. In some embodiments, all packets until the ith packet transmission may be received correctly, and hence, the transmitted NOM packets during the current transmission can be expressed as:

$$S_i = \sqrt{\alpha_{i,1}^{(\cdot)}} X_{i,l}^{(1)} + \sqrt{\alpha_{i+1,1}^{(\cdot)}} X_{i+1,1}^{(1)} \quad (2)$$

where $\alpha_{i,1}^{(\cdot)}$ and $\alpha_{i+1,1}^{(\cdot)}$ are the powers allocated for the primary and secondary packet, respectively, and $\alpha_{i,1}^{(\cdot)} + \alpha_{i+1,1}^{(\cdot)} = 1$. Since the power allocated is fixed for a given configuration, $\alpha_{i,1}^{(\cdot)}$ may be $\alpha$ and $\alpha_{i+1,1}^{(\cdot)} = 1-\alpha$. The first subscript in the transmitted packets may indicate the packet sequence number, and the superscript may indicate the transmission counter of the primary packet, which indicates when a packet may be dropped. The second subscript may represent the total number of transmissions of a packet as primary or secondary. The received composite NOM packet can be expressed as:

$$y_{i,l}^{(l)} = h_i^{(l)} S_i + w_i^{(l)} \quad (3)$$

where w is the AWGN vector whose elements are independent and identically distributed, $w \sim \mathcal{CN}(0, \sigma_w^2 I)$, I is a K×K identity matrix, and K is the packet length. In some embodiments, for example in which binary phase shift keying (BPSK) is adopted, K=B.

In some embodiments, detection of $y_{i,l}^{(\ell)}$ may depend on the value of $\ell$ and may generally follow detection used in NOMA systems in which the packet with high power is detected first while considering the low power packet as unknown noise. For $\ell=1$, the primary packet may be transmitted once such as $\hat{x}_i = \mathcal{D}_1\{y_{i,l}^{(1)}\}$. The secondary packet $x_{i+1}$ may be detected by applying successive interference cancellation (SIC) and then MLD of the resultant sequence:

$$x_{i+1} = D_1\{y_{i,l}^{(1)} - h_i^{(1)}\sqrt{\alpha_{i,l}^{(1)}} x_i\} \quad (4)$$

For notational simplicity, the three operations used to detect $x_i$ and $x_{i+1}$, for MLD of $x_i$, SIC, and MLD of $x_{i+1}$ can be denoted:

$$\{\hat{x}_i, \hat{x}_{i+1}\} = D_2\{y_{i,l}^{(1)}\}. \quad (5)$$

Figure 2:
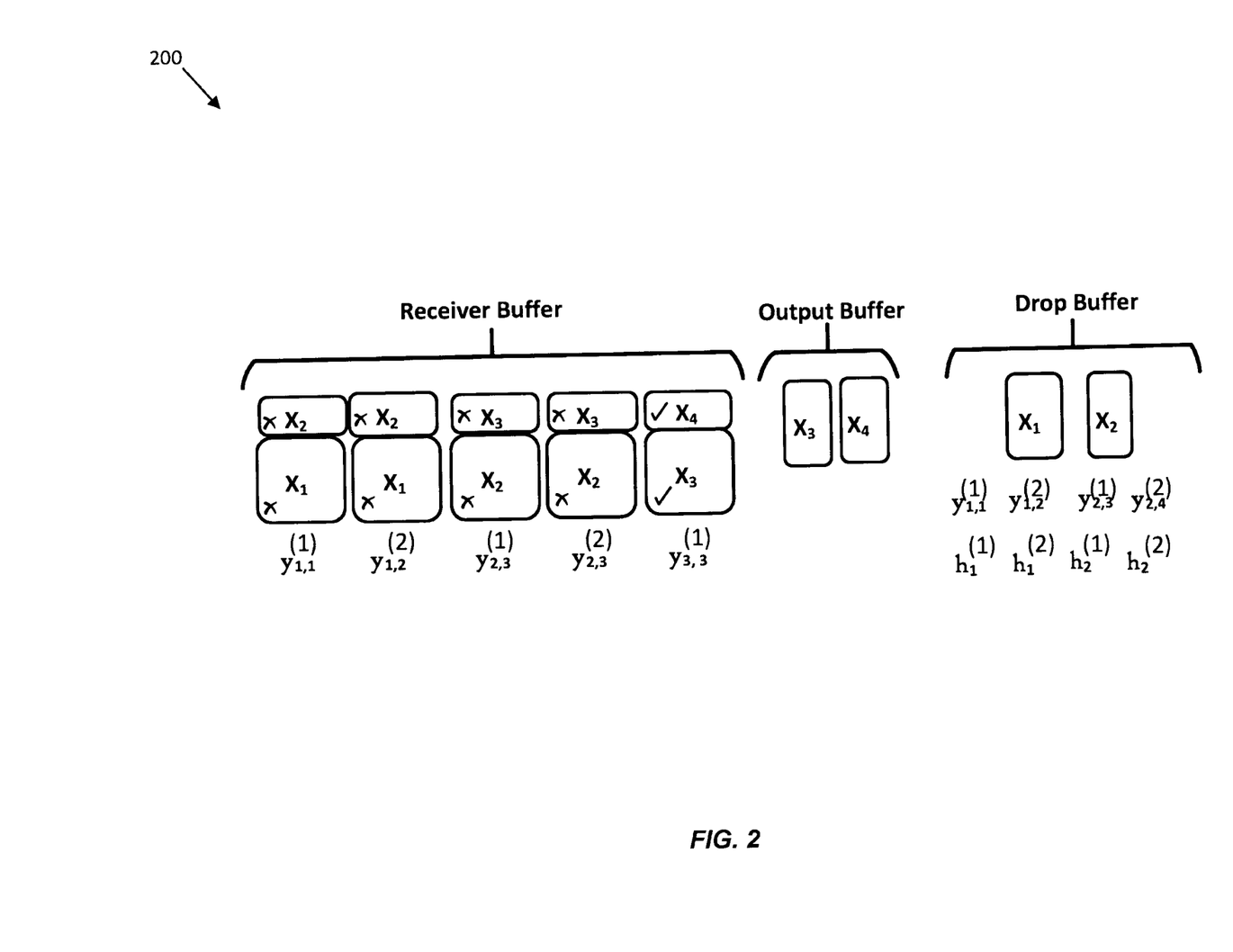
FIG. 2 is an example in which data packets can be multiplexed and transmitted during a first transmission slot according to some embodiments.

Due to ARQ, the received sequences $y_{i,l}^{(\ell)}$ may be fully correlated or partially correlated. FIG. 2 is an example 200 in which $x_1$ and $x_2$ can be multiplexed and transmitted during a first transmission slot. In some embodiments, $x_1$ and $x_2$ may fail the CRC process and may be retransmitted. As illustrated in the example 200, the CRC for $x_1$ may fail again, and thus $x_1$ can be dropped because L=2 in this example. In some embodiments, $y_{1,1}^{(1)}$ and $y_{1,2}^{(2)}$ may be fully correlated because they include the same data packets. After dropping $x_1$, $x_2$ may be considered as the primary packet, and hence $x_2$ can be multiplexed with $x_3$ and then transmitted. Therefore, $y_{1,2}^{(2)}$ and $y_{2,3}^{(1)}$ can be partially correlated because they have one packet in common, which can be $x_2$. Similarly, $y_{2,3}^{(1)}$ and $y_{2,4}^{(2)}$ can be fully correlated while $y_{2,4}^{(2)}$ and $y_{3,3}^{(1)}$ can be partially correlated.

As illustrated in FIG. 2, packets $x_3$ and $x_4$ may be successfully detected in the 5th transmission slot, while packets $x_1$ and $x_2$ may be dropped because they exceeded the maximum number of allowed transmissions. Additionally, and as further illustrated in FIG. 2, $y_{3,3}^{(1)}$ may be partially correlated with $y_{2,3}^{(1)}$ and $y_{2,4}^{(2)}$ such that $x_3$ may be a common packet between the two received sequences. The interference caused by $x_3$ to $y_{2,3}^{(1)}$ and $y_{2,4}^{(2)}$ can be eliminated using a SIC process. The SIC in this example may be different from the conventional SIC used in NOMA because in this example, the weak interference can be eliminated, for example rather than the strong interference. Once the interference is eliminated, the sequences $y_{2,3}^{(1)}$ and $y_{2,4}^{(2)}$ can be interference-free, and the sequences can be combined and detected. The probability of successful detection may be higher than the initial detection process in the presence of interference. Given that $x_2$ is successfully recovered, the same process can be applied to cancel the interference from $y_{1,1}^{(1)}$ and $y_{1,2}^{(2)}$, and then attempt to re-detect etc.

The processing performed at each transmission session is illustrated in Table 1 and can be as follows:

TS 1: The transmitter can transmit $s_1$, which may be received as $y_{1,1}^{(1)}$ as in Equation 3. The primary packet $x_1$ may be detected erroneously, as indicated by the CRC process, then the detection process for packet $x_2$ may not be initiated, and a retransmission can be requested using a NACK.

TS 2: The transmitter can retransmit $s_1$. The received sequence in this case can be $y_{1,2}^{(2)}$. In this case, the received sequences $y_{1,1}^{(1)}$ and $y_{1,2}^{(2)}$ may be fully correlated, and CC can be used to combine the sequences. The combining process can be:

$$C\{y_{1,1}^{(1)}, y_{1,2}^{(2)}\} \triangleq d_1 = \frac{[h_1^{(1)}]^* y_{1,1}^{(1)} + [h_1^{(2)}]^* y_{1,2}^{(2)}}{|h_1^{(1)}|^2 + |h_1^{(2)}|^2} \quad (6)$$

where $[\cdot]^*$ denotes the complex conjugate operator. The sequence $d_1$ can be passed to the detector to recover the packet $x_i$, which can give the detected packet $\hat{x}_1$. Given that $\hat{x}_i \neq x_i$, then the receiver may transmit a NACK to the transmitter to drop $x_1$ since $x_1$ has reached the maximum number of transmissions. Additionally, the receiver may discard $\hat{x}_1$ and may store the associated received sequences $y_{1,1}^{(1)}$ and $y_{1,2}^{(2)}$, and the corresponding channel coefficients $h_1^{(1)}$ and $h_1^{(2)}$, in drop buffer A. In some embodiments, Equation 6 may be equivalent to an MRC process at the packet level and can be extended for arbitrary numbers of users.

TS 3: The transmitter may drop $x_1$ and may generate $s_2$ by multiplexing packets $x_2$ and $x_3$. The received sequence in this case can be Because is partially correlated with $y_{1,1}^{(1)}$ and $y_{1,2}^{(2)}$, CC may not be able to be applied and $y_{2,3}^{(1)}$ can be directly applied to the detector to generate $\hat{x}_2$. Assuming that $\hat{x}_2 \neq x_2$, the receiver can transmit a NACK to the transmitter asking for retransmission of $s_2$.

TS 4: The transmitter can, for the second time, transmit $s_2$, which can be received as $y_{2,4}^{(2)}$. Therefore, $y_{2,3}^{(1)}$ and $y_{2,4}^{(2)}$ may be fully correlated and can be combined as described in Equation 6 to produce $d_2$. The detector can fail to detect $x_2$ correctly, and the receiver may transmit a NACK to the transmitter to drop $x_2$. Additionally, the sequences $y_{2,3}^{(1)}$ and $y_{2,4}^{(2)}$ and the corresponding channels information can be stored in the drop buffer A.

TS 5: The transmitter can transmit $s_3$, which can be received as $y_{3,3}^{(1)}$. Because $y_{3,3}^{(1)}$ is partially correlated with the buffered sequences, then $y_{3,3}^{(1)}$ cannot be combined with any other sequence, and hence, $y_{3,3}^{(1)}$ can be applied directly to the detector. Given that packet $x_3$ is detected correctly, then SIC can be applied to extract $x_4$. In some embodiments, the partial correlation between $y_{2,3}^{(1)}$, $y_{2,4}^{(2)}$, and $x_3$ can be exploited to apply a packet repair and recovery process, which can be described as follows.

1) Because $x_3$ is considered as interference with respect to $y_{2,3}^{(1)}$ and $y_{2,4}^{(2)}$, its detrimental effect can be eliminated as, $$\tilde{y}_{2,3}^{(1)} = y_{2,3}^{(1)} - \sqrt{\overline{\alpha_{2,3}^{(1)}}} h_2^{(1)} \hat{x}_3 \quad (7)$$

$$\tilde{y}_{2,4}^{(2)} = y_{2,4}^{(2)} - \sqrt{\overline{\alpha_{2,4}^{(2)}}} h_2^{(2)} \hat{x}_3. \quad (8)$$

The interference cancellation (IC) in this case can be denoted as retroactive IC (RIC) because the cancellation can be performed between symbols from different transmission slots. The signal to interference plus noise ratios (SINRs) of $\tilde{y}_{2,3}^{(1)}$ and $\tilde{y}_{2,4}^{(2)}$ may be expected to be improved compared to the SINRs of $y_{2,3}^{(1)}$ and $y_{2,4}^{(2)}$ due to the IC.

2) Compute $d_2 = C\{\tilde{y}_{2,3}^{(1)}, \tilde{y}_{2,4}^{(2)}\}$ as described in Equation 6, then apply $d_2$ to the detector to generate $\hat{x}_2$. If $\hat{x}_2 = x_2$, the same process can be repeated by applying the MC to eliminate the effect of $x_2$ from $y_{1,1}^{(1)}$ and $y_{1,2}^{(2)}$, and then detect $x_1$. If $\hat{x}_2 \neq x_2$, then the packet recovery and repair technique can be terminated, $x_1$ and $x_2$ may be dropped permanently, and the drop buffer may be cleared.

3) At this stage, the receiver may have managed to repair and recover $x_2$, $x_1$ and $x_2$, or neither. In some embodiments, the drop buffer can be cleared because the next transmitted packets may be independent of the buffered sequences.

TS 6: At this stage, the transmitter can transmit two new packets, which may be $x_5$, $x_6$. Because NOM may limit the packet multiplexing to two packets, then generalizing the considered example implies that L can be a factor to be considered. Thus, $x_1$ can be transmitted L times as the primary packet, and CC can be applied up to L−1 times. For each primary packet, the drop buffer may save a maximum of L copies, which can include $y_{i,1}^{(1)}, y_{i,2}^{(2)}, \ldots y_{i,L}^{(L)}$. In examples in which the transmitter has M packets to send, then the receiver may buffer LM−1 sequences, and the packet recovery and repair technique may operate offline and backwards until the packets are recovered, or the partial correlation link is broken when a particular packet is permanently dropped. Algorithm 1 may represent the generalized packet recovery and repair technique for L≥2.

TABLE I

Example of PRR for L = 2 and M = 4

| TS | $y_{i,l}^{(l)}$ | Process | Output | CRC | Drop buffer |
|---|---|---|---|---|---|
| 1 | $y_{1,1}^{(1)}$ | $D_2\{y_{1,1}^{(1)}\}$ | $\hat{x}_1, \hat{x}_2$ | 0, 0 | $y_{1,1}^{(1)}, h_1^{(1)}$ |
| 2 | $y_{1,2}^{(2)}$ | 1) $d_1 = C\{y_{1,1}^{(1)}, y_{1,2}^{(2)}\}$, 2) $D_2\{d_1\}$ | $\hat{x}_1, \hat{x}_2$ | 0, 0 | $y_{1,1}^{(1)}, y_{1,2}^{(2)}, h_1^{(1)}, h_2^{(2)}$ |
| 3 | $y_{2,3}^{(1)}$ | $D_2\{y_{2,3}^{(1)}\}$ | $\hat{x}_2, \hat{x}_3$ | 0, 0 | $y_{1,1}^{(1)}, y_{1,2}^{(2)}, y_{2,3}^{(1)}, h_1^{(1)}, h_1^{(2)}, h_2^{(1)}$ |
| 4 | $y_{2,4}^{(2)}$ | 1) $d_2 = C\{y_{2,3}^{(1)}, y_{2,4}^{(2)}\}$, 2) $D_2\{d_2\}$ | $\hat{x}_2, \hat{x}_3$ | 0, 0 | $y_{1,1}^{(1)}, y_{1,2}^{(2)}, y_{2,3}^{(1)}, y_{2,4}^{(2)}, h_1^{(1)}, h_1^{(2)}, h_2^{(1)}, h_2^{(2)}$ |
| 5 | $y_{i,l}^{(l)}$ | 1) $D_2\{y_{3,3}^{(1)}\}$ 2) $\hat{y}_{2,3}^{(1)}, \hat{y}_{2,4}^{(1)}$, 3) $\tilde{d}_2 = C\{\hat{y}_{2,3}^{(1)}, \hat{y}_{2,4}^{(1)}\}$, 4) $D_1\{\tilde{d}_2\}$ | $\hat{x}_3, \hat{x}_4$ $\hat{x}_2$ $\hat{x}_1$ | 1, 1 1 1 | $y_{1,1}^{(1)}, y_{1,2}^{(2)}, y_{2,3}^{(1)}, y_{2,4}^{(2)}, h_1^{(1)}, h_1^{(2)}, h_2^{(1)}, h_2^{(2)}$ $y_{1,1}^{(1)}, y_{1,2}^{(2)}, h_1^{(1)}, h_2^{(2)}$ — |

TABLE I-continued

Example of PRR for L = 2 and M = 4

| TS | $y_{i,l}^{(l)}$ | Process | Output | CRC | Drop buffer |
|---|---|---|---|---|---|
| | | 5) $\hat{y}_{1,1}^{(1)}, \hat{y}_{1,2}^{(2)}$, | | | |
| | | 6) $\hat{d}_1 = C\{\hat{y}_{1,1}^{(1)}, \hat{y}_{1,2}^{(2)}\}$ | | | |
| | | 7) $D_1\{\hat{d}_1\}$ | | | |

```
Algorithm 1: Packet repair and recovery

1   Input: y_{i,l}^{(l)}, h_i^{(l)} % the received sequence and channel
2   Output: X, %the set of recovered packets x̂
3   X = θ
4   d_1 = C {y_{i,l-(l-1)}^{(1)},....., y_{i,l}^{(l)}}
5   {x̂_i, x̂_{i+1}} = D_2{d_1}
6   if x̂_i fails CRC then
7   |                   buffer y_{i,l}^{(l)}, h_i^{(l)}
8   |                   return
9   end
10  if x̂_{i+1} fails CRC then
11  |                   X = X U {x̂_i}
12  else
13  |                   X = X U {x̂_i, x̂_{i+1}}
14  end
15  while drop buffer is not empty do
16  |          extract the L received sequences from the drop buffer
17  |          use RIC to estimate ỹ_{i-1,j-(L-1)}^{(1)},....,^{(1)}ỹ_{i-1,j}^{(L)} as in
        (7) and (8)
18  |          d_2 = C{ỹ_{i-1,l-(L-1)}^{(1)},.....,^{(1)}ỹ_{i-1,l}^{(L)}}
19  |          x̂_{i-1} = D_1{d_2}
20  |          if x̂_{i-1} fails CRC then
21  |          |          empty the drop buffer
22  |          |          return
23  |          else
24  |          |          X = X U {x̂_{i-1}}
25  |          |          i = i - 1
26  |          end
27  end
```

Figure 3:
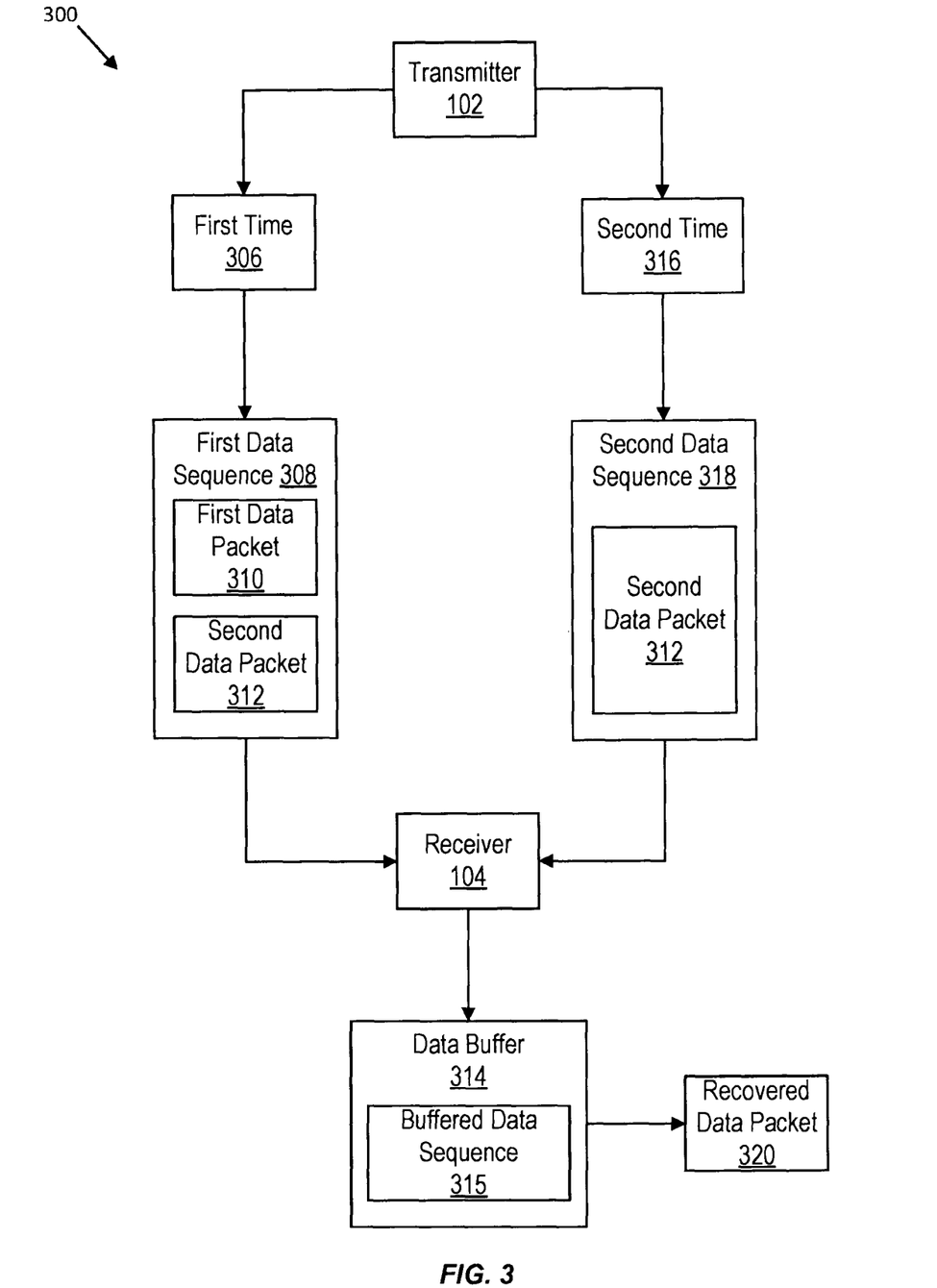
FIG. 3 is a computing environment that can implement dropped-packets repair and recovery according to some embodiments.

FIG. 3 is a computing environment 300 that can implement dropped-packets repair and recovery according to some embodiments. As illustrated, the computing environment 300 includes a transmitter 102 and a receiver 104. The transmitter 102 may be communicatively coupled with the receiver 104 such as via a wireless medium (or even a wired medium) that can facilitate exchange (e.g., transmission and reception) of at least data. The transmitter 102 may be configured to transmit one or more data sequences, which each may include one or more data packets, to the receiver 104.

In some embodiments, and at a first time 306, the transmitter 102 may transmit a first data sequence 308 to the receiver 104. The first data sequence 308 may include a first data packet 310 and a second data packet 312, though other suitable numbers (e.g., less than two or more than two) of data packets can be included in the first data sequence 308. The receiver 104 may attempt to receive the first data sequence 308. In some embodiments, if the receiver 104 successfully receives the first data sequence 308, the receiver 104 may transmit a positive acknowledgement (e.g., an ACK) to the transmitter 102, and the transmitter 102 may proceed to transmit subsequent data sequences having different data packets. In other embodiments, the receiver 104 may fail to properly receive at least one data packet such as the first data packet 310, the second data packet 312, or a combination thereof.

In embodiments in which the receiver 104 fails to properly receive at least one data packet, for example if the receiver 104 erroneously detects the first data packet 310, the second data packet 312, or a combination thereof, the receiver 104 may store the first data sequence 308 in a data buffer 314 as a buffered data sequence 315. The receiver 104 may transmit a negative acknowledgement (e.g., a NACK) to the transmitter 102 to request retransmission of one or more of the data packets. For example, the NACK transmitted from the receiver 104 to the transmitter 102 may cause the transmitter 102 to transmit a second data sequence 316 to the receiver. The second data sequence 316 may include the second data packet 312 but may exclude the first data packet 310.

The receiver 104 may receive the second data packet 312 and may attempt to detect the second data packet 312. In some embodiments, the receiver 104 may erroneously detect the second data packet 312, and the receiver 104 may transmit a NACK to the transmitter 102 to permanently drop the first data packet 310 and/or the second data packet 312. In other embodiments, the receiver 104 may successfully detect the second data packet 312. The receiver 104 may leverage the successful detection of the second data packet 312 to detect the first data packet 310. For example, the receiver 104 may detect the first data packet 310 (e.g., as recovered data packet 320) based on the buffered data sequence 315.

The receiver 104 of FIG. 3 can implement the techniques described in FIG. 2 for the processing of the data sequences. Similarly, the transmitter 102 of FIG. 3 can implement the techniques described in FIG. 2 for the transmission (and ret-transmission) of data sequences.

Figure 4:
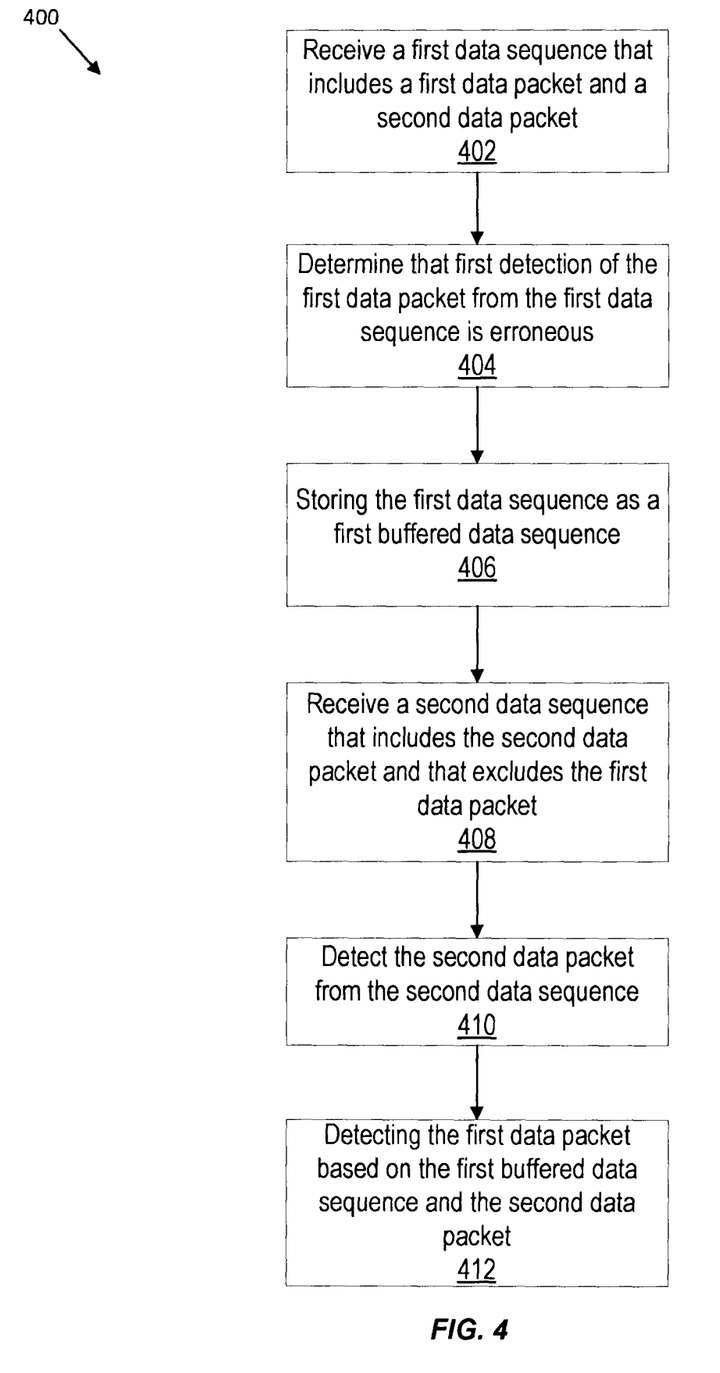
FIG. 4 is a flowchart of a process for implementing dropped-packets repair and recovery according to some embodiments.

FIG. 4 is a flowchart of a process 400 for implementing dropped-packets repair and recovery techniques according to some embodiments. At block 402, the process 400 involves receiving a first data sequence that includes a first data packet and a second data packet. In some embodiments, a computing device (e.g., a receiver 104) may receive the first data sequence from a transmitter (e.g., a transmitter 102).

At block 404, the process 400 involves determining that first detection of the first data packet from the first data sequence is erroneous. In some embodiments, the computing device may perform CRC check on the first data sequence and determine a CRC failure, thereby declaring an erroneous data sequence detection. The computing device may determine from CRC that one or more data packets (e.g., the first data packet) included in the first data sequence is detected erroneously.

At block 406, the process 400 involves storing the first data sequence in a data buffer as a first buffered data sequence. In response to determining that the one or more data packets are detected erroneously, the computing device may store the first data sequence in the data buffer as the first buffered data sequence for later use. In some embodiments, the first buffered data sequence may include the erroneously detected first data packet and the second data packet.

At block 408, the process 400 involves receiving a second data sequence that includes the second data packet. In some embodiments, the second data sequence may omit the first data packet that had an erroneous detection. The computing device, or the receiver, may attempt to detect the second data packet included in the second data sequence.

At block 410, the process 400 involves detecting the second data packet. The computing device may successfully detect the second data packet based on the second data sequence, which may include a retransmission of at least the second data packet.

At block 412, the process 400 involves detecting the first data packet based on the second data packet and the first buffered data sequence. The computing device can use the first buffered data sequence and the detected second data packet to recover the first data packet. For example, the computing device can leverage correlation between the second data packet and one or more data packets included in the first buffered data sequence as described in FIG. 2. Leveraging the correlation may allow the computing device to recover the first data packet without directly detecting the first data packet from a transmission from the transmitter.

An application of the packet recovery and repair techniques can include image transmission of monitoring cameras in ITS systems. Such applications can tolerate some delay, which can be up to several seconds. Additionally, some of the images can be stored for future reuse. In image transmission systems, when a packet loss occurs and the receiver is unable to recover a certain packet, the receiver can employ error concealment to minimize artifacts caused by the missing packet in the received image. Enhancing the image quality at the receiver, for example, can be achieved using a zero or white insertion mechanism in which missing packets in the received image are replaced with all-zero or all-white packets, respectively, for dark and bright input images. The image received following zero or white-insertion may be a concealed image. Additionally, a moving average filter (MAF) can be applied to the concealed images in order to reconstruct the missing packets, which can improve the visual quality in terms of PSNR. The sides of the received images can be padded with additional W pixels, where W is the size of the window in the MAF. Padding techniques may include replicating the boundary pixels, padding all zeros or all white pixels, or extrapolating the boundary pixels. The window can be applied to pixels with intensities less than a predefined threshold, and the considered pixels can be replaced with the mean of the pixels in the window. If zero-insertion is used on the receiving image, the pre-defined threshold may be 0. A larger window size may cause image blurring, and a small window may produce visible edges. Due to higher packet loss at low SNR region, a bigger window can be used to minimize artifacts caused by zero or white-insertion and to produce a smoother output image. A small window can be used to conceal images received under good SNR conditions.

Assessing the quality of reconstructed images can be performed using the PSNR, which can be represented in decibels. The PSNR can determine the visual difference between two images A and B and can be defined as:

$$PSNR\{A, B\} = 10\log_{10}\left(\frac{\text{Max}\{A\}}{MSE\{A, B\}}\right) \quad (9)$$

where Max{A} is the transmitted gray image's maximum pixel intensity, which is 255 for images with 8 bits per pixel, and the mean squared error (MSE) for an m×n pixel image can be given by:

$$MSE\{A, B\} = \frac{1}{mn}\sum_{i=0}^{m-1}\sum_{j=0}^{n-1}[A(i, j) - B(i, j)]2. \quad (10)$$

Figure 5:
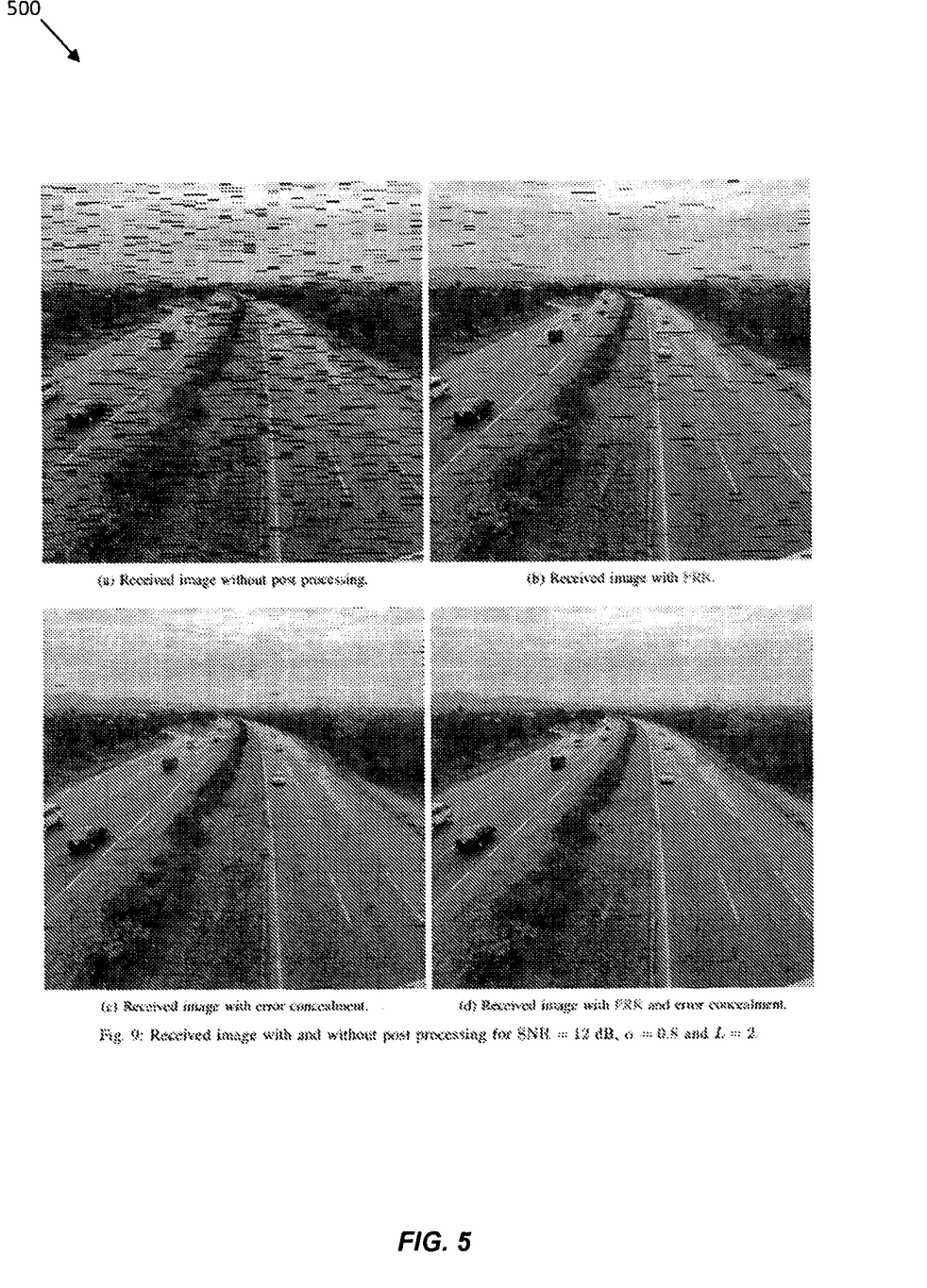
FIG. 5 is an example of images that can be processed with dropped-packets repair and recovery according to some embodiments.

FIG. 5 is an example of images 500 that can be processed with dropped-packets repair and recovery techniques according to some embodiments. In some embodiments, FIG. 5, or the images included therein, can be used to evaluate the visual impact of the packet recovery and repair techniques disclosed herein. The images can be presented for α=0.8 and 0.9, respectively, and for L=2. As illustrated in FIG. 5, four different scenarios are illustrated: a) the image is presented without error concealment nor packet recovery and repair, b) the image is improved using packet recovery and repair, c) error concealment is used, and d) error concealment and packet recovery and repair are used. By comparing (a) and (b), significant improvement can be achieved by using packet recovery and repair. Comparing (a) and (c) shows that the error concealment can improve the received image, but the improvement may be limited due to the large number of dropped packets. Additionally, (d) may show that the received image quality can be improved substantially when both techniques are applied.

Figure 6:
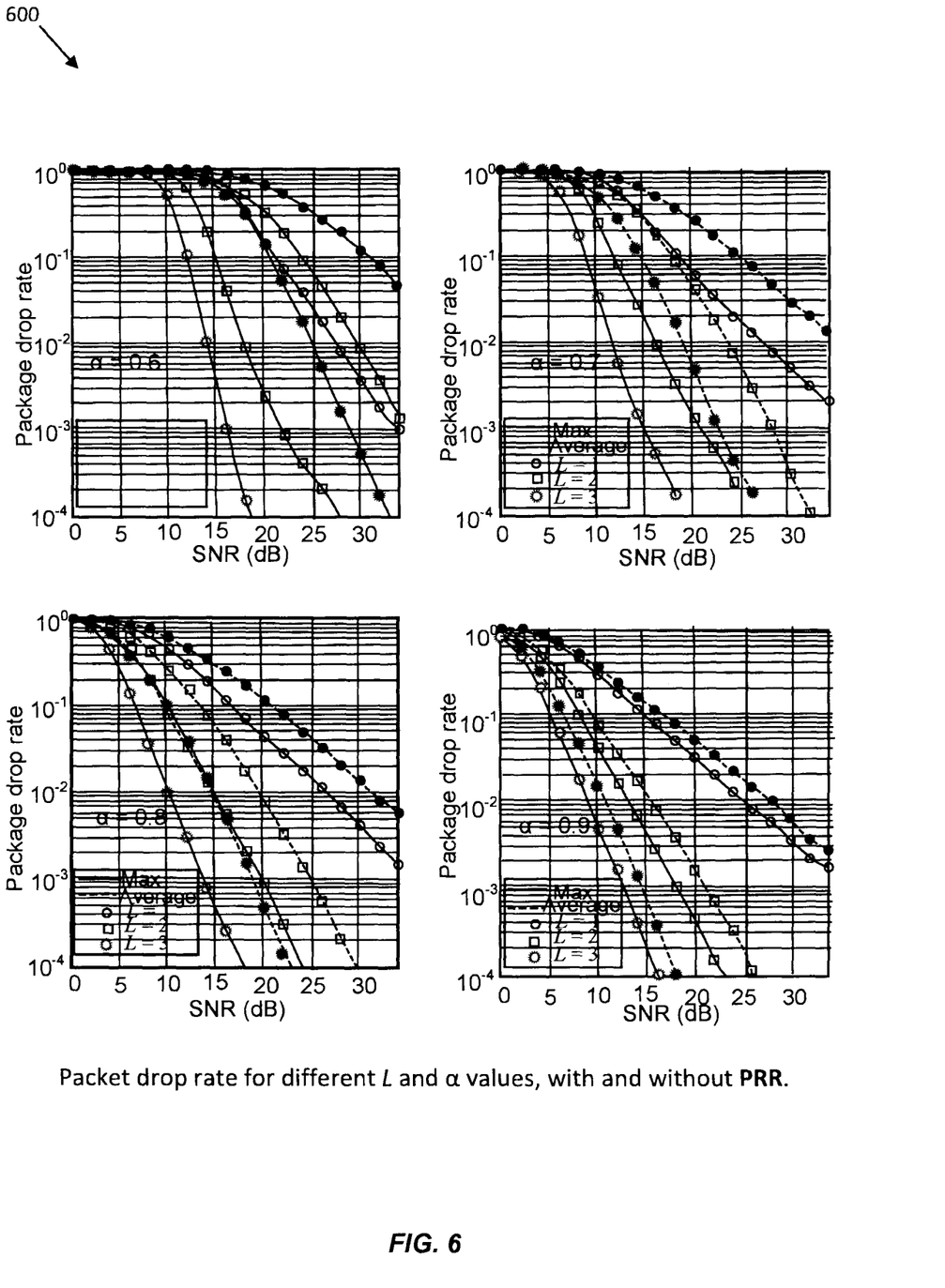
FIG. 6 is an example of graphs of packet drop rates with and without dropped-packets repair and recovery according to some embodiments.

FIG. 6 is an example of graphs 600 of packet drop rates with and without dropped-packets repair and recovery according to some embodiments. The graphs 600 may illustrate the performance evaluation of the packet recovery and repair technique in terms of packet drop rate (PDR), PSNR, number of recovered packets, buffer occupancy, visualized images, or the like. The illustrated results may be presented for SNR values that range from 0 to 35 dB, maximum allowable transmissions per packet L∈{1, 2, 3}, and power coefficient α∈{0.6, 0.7, 0.8, 0.9}. The channel may be modeled as a block Rayleigh fading, and the information bits may be modulated using BPSK. The error concealment technique to reduce the impact of the dropped packets may be based on zero-insertion and MAF. The error concealment can be used with the visualized images. The Monte Carlo simulation may be generated using $2^{16}$=65,536 packets each of which has 128 bits. A packet may be dropped if the packet fails the CRC after being transmitted as a primary packet for L transmissions and the packet recovery and repair technique fails to recover it.

In some embodiments, FIG. 6 may compare the system PDR with and without packet recovery and repair using various values of α and L. As illustrated, the PDR may improve significantly for all values of α and L. For example, with α=0.6 and L=3, the PDR can be improved by about 15 dB at PDR of $10^{-4}$. For the case of α=0.8, the improvement may be about 6 dB. The PDR improvement variation due to varying L can be small where roughly the same improvement is achieved for all the considered values of L. The efficiency of the packet recovery and repair can be significant at low values of a, which may result from interference from the secondary packets, which may be more severe in such scenarios. Thus, applying the MC may cause significant SINR improvement.

Figure 7:
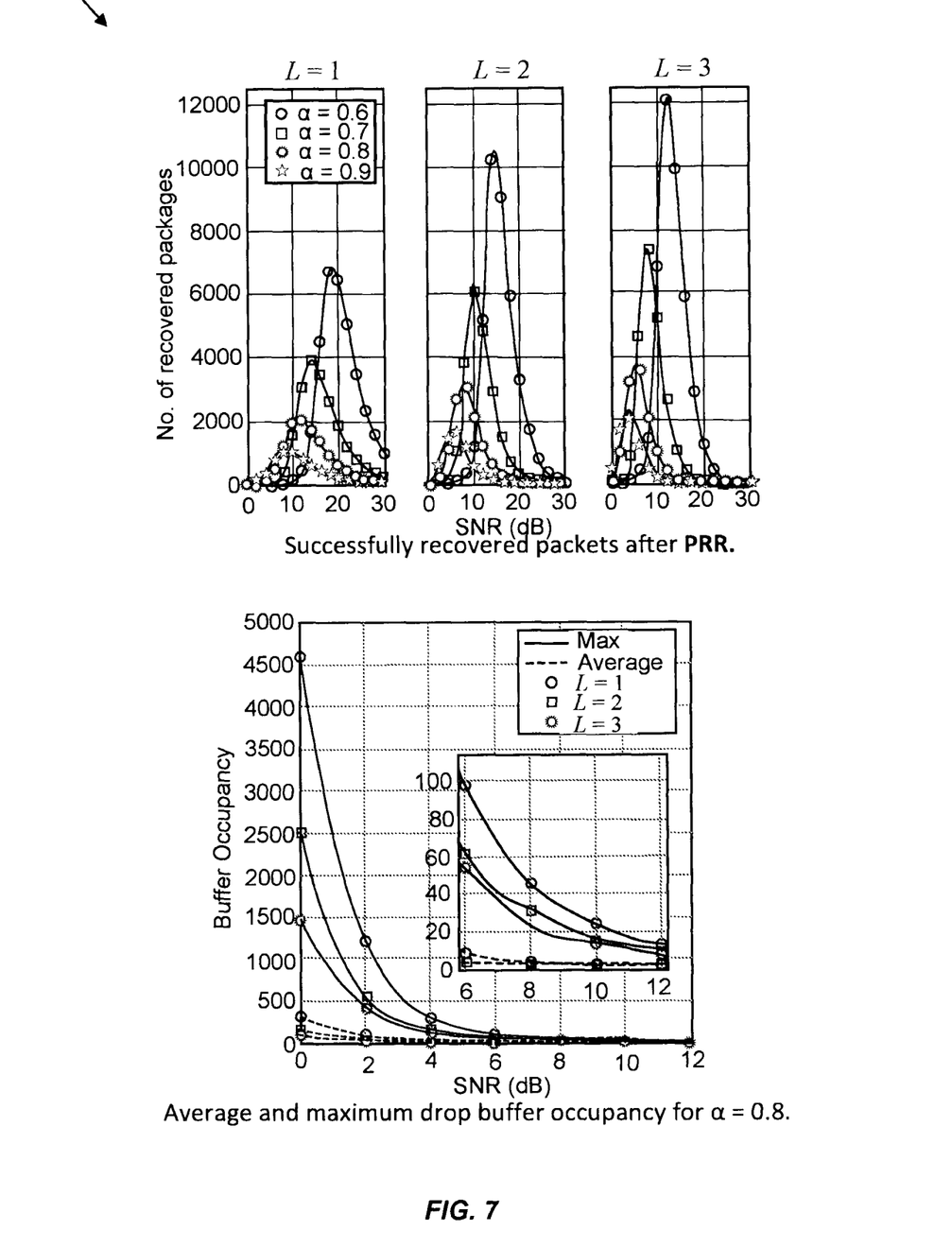
FIG. 7 is an example of graphs of successfully recovered packets and buffer occupancy for dropped-packets repair and recovery techniques according to some embodiments.

FIG. 7 an example of graphs 700a-b of successfully recovered packets and buffer occupancy for dropped-packets repair and recovery techniques according to some embodiments. The graph 700a may illustrate the actual number of packets that were repaired and recovered after exceeding the maximum number of permitted transmissions, and being dropped by the transmitter. The illustrated results in the graph 700a may be obtained by considering that the total number of packets to be transmitted is M=16,384 packets, and the results can be averaged over multiple (e.g., four) realizations. The packet recovery and repair technique can effectively repair and recover a significant portion of the dropped of packets, for example for low values of a and high L values, though other values are possible. In one particular example, the packet recovery and repair technique can recover about 12,000 packets at SNR=12 dB, $\alpha$=0.6, and L=3. Since the PDR for the considered scenario is about 0.9, the packet recovery and repair technique can recover about 80% or more of the dropped packets. Decreasing the value of L may increase the probability that certain packets will be permanently dropped due the loss of correlation at multiple positions in the buffered sequences. Increasing the value may reduce the interference caused by the secondary packets, and thus, a smaller number of packets can be recovered. For example, for $\alpha$=0.7 and L=3, the maximum number of packets that was recovered is about 7,500 at SNR of 10 dB. By considering that PDR=0.7 at the considered SNR, then the packet recovery and repair can recover about 65% of the dropped packet. At high SNR, the number of dropped packets may be small, and thus, most initially dropped packets can be recovered using the packet recovery and repair. In some instances, the recovery ratio may be approximately 100%.

The graph 700b may illustrate buffering of the packet recovery and repair technique for $\alpha$=0.8 and 0.9, respectively, and for L=[1, 2, 3]. The graph 700b may illustrate the maximum and average buffer occupancy. The maximum buffer occupancy can be used as an indicator for the drop buffer capacity, and the average buffer occupancy can be used to indicate the average delay. As illustrated in the graph 700b, the buffer occupancy at SNR=0 dB and L=1 is about 4,500 packets. In some embodiments, the SNR$\geq$2 dB and L=3, which may imply that the buffer size may be about 500 packets. The average buffer capacity can be less than 100 packets for L=3. However, the buffering delay may be smaller because the primary packet has high power and the interference is weaker. In such cases, the receiver can either recover or permanently drop the buffered packet. Additionally, the packet recovery and repair technique can be used for delay-tolerant applications.

Figure 8:
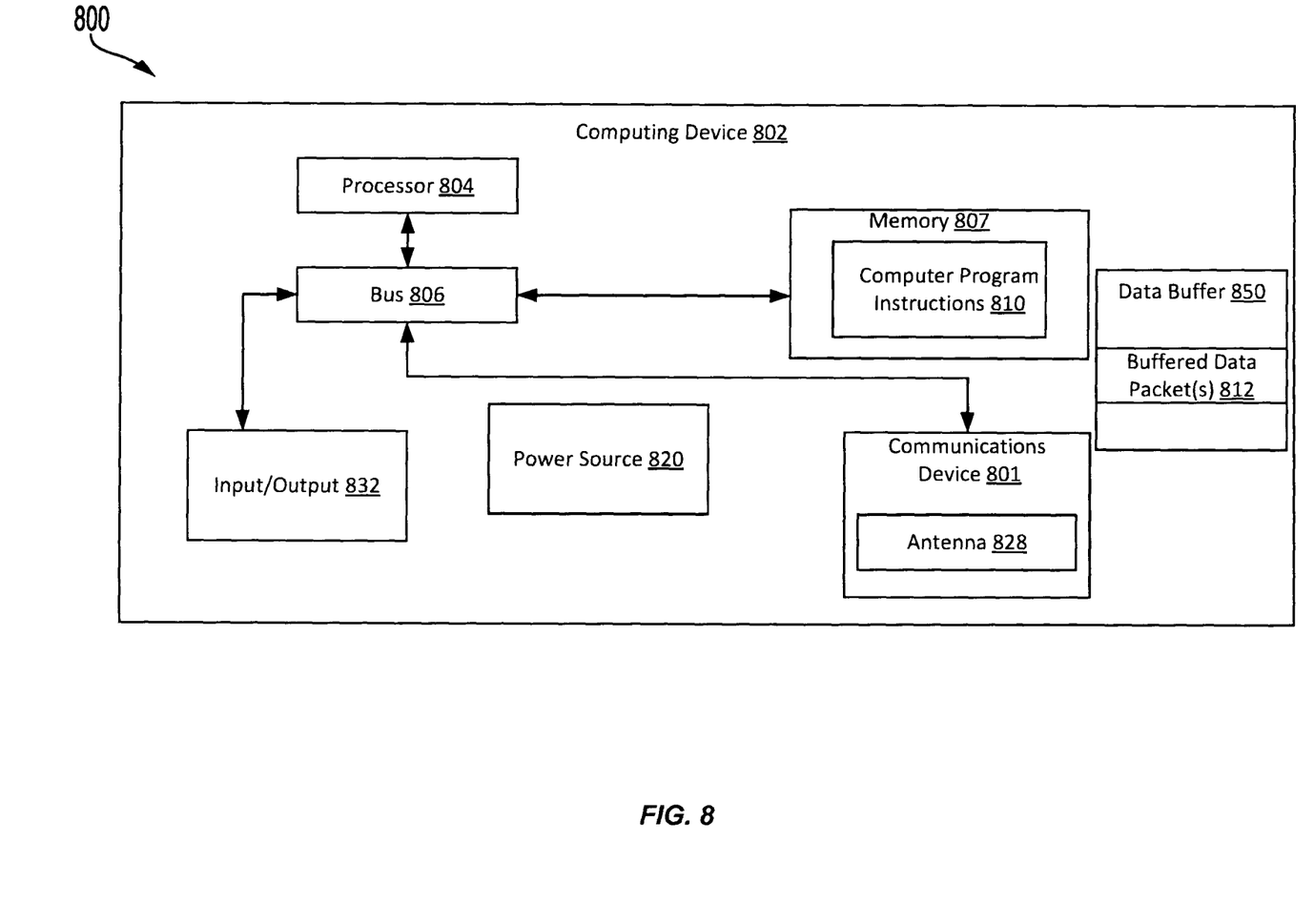
FIG. 8 is a block diagram of a computing system that can implement dropped-packets repair and recovery according to some embodiments.

FIG. 8 is a block diagram of a computing system 800 that can implement dropped-packets repair and recovery according to some embodiments. The computing system 800 is an example of a transmitter 102 and/or a receiver 104. The components shown in FIG. 8, such as a processor 804, a memory 807, a power source 820, a data buffer 850, a communications device 801, etc., may be integrated into a single structure, such as within a single housing of a computing device 802. Alternatively, the components shown in FIG. 8 can be distributed from one another and in electrical communication with each other.

The computing system 800 may include the computing device 802. The computing device 802 can include the processor 804, the memory 807 (e.g., non-volatile), and a bus 806. The processor 804 can execute one or more of the operations disclosed herein, for example, relating to a packet recovery and repair technique. The processor 804 can execute instructions stored in the memory 807 to perform the operations. The processor 804 can include one processing device or multiple processing devices or cores. Non-limiting examples of the processor 804 include a Field-Programmable Gate Array ("FPGA"), an application-specific integrated circuit ("ASIC"), a microprocessor, etc.

The processor 804 can be communicatively coupled to the memory 807 via the bus 806. The memory 807 may include any type of memory device that retains stored information when powered off. Non-limiting examples of the memory 807 may include EEPROM, flash memory, or any other type of non-volatile memory. In some examples, at least part of the memory 807 can include a medium from which the processor 804 can read the instructions. A computer-readable medium can include electronic, optical, magnetic, or other storage devices capable of providing the processor 804 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, Perl, Java, Python, etc.

In some examples, the memory 807 can include computer program instructions 810 that can be executed by the processor 804 to perform various operations. Additionally, the data buffer 850 can include computer memory or other types of digital or analog storage that can store one or more buffered data sequence(s) 812. For example, the data buffer 850 can store the first data sequence 308 as the buffered data sequence 315 to be subsequently used to recover or repair erroneously detected data packets, as described herein.

The computing device 802 can include a power source 820, which can be in electrical communication with the computing device 802 and the communications device 801 (e.g., an RF chain that includes one or more antenna 828, amplifiers, analog to digital converters, digital to analog converters, filters, etc.). In some examples, the power source 820 can include a battery, or a suitable electrical cable, and can include an AC signal generator. The computing device 802 can operate the power source 820 to apply a transmission signal to an antenna 828 to generate electromagnetic waves that convey data relating to the approximations to other systems. For example, the computing device 802 can cause the power source 820 to apply a voltage with a frequency within a specific frequency range to the antenna 828. This can cause the antenna 828 to generate a wireless transmission. In other examples, the computing device 802, rather than the power source 820, can apply the transmission signal to the antenna 828 for generating the wireless transmission.

The computing device 802 can additionally include an input/output interface 832, which can connect to a keyboard, pointing device, display, and other suitable computer input/output devices. Input can be provided using the input/output interface 832. Data relating to the approximations of the functions can be displayed via the input/output interface 832.

The packet recovery and repair technique can be used in delay-tolerant systems. The packet recovery and repair technique can exploit the correlation among the received sequences to repair and recover the packets that were dropped by the transmitter and initially discarded by the receiver because the packets failed the detection process. The reliability of the received data can be improved without any additional spectrum utilization or power consumption. The packet recovery and repair technique reflected results that illustrate that the packet recovery and repair technique can, in some embodiments, recover 100% of the dropped packets, and the PDR can be improved by 15 dB or more in certain scenarios.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

While the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

What is claimed is:

1. A method implemented by a first device, the method comprising:
   receiving, at a first time, a first data sequence that includes a first data packet and a second data packet;
   determining that first detection of the first data packet from the first data sequence is erroneous;
   storing, in a memory buffer based on the first detection being erroneous, the first data sequence as a first buffered data sequence;
   receiving, at a second time, a second data sequence that includes the second data packet and that excludes the first data packet;
   detecting the second data packet from the second data sequence; and
   performing a second detection of the first data packet based on the first buffered data sequence and the second data packet.

2. The method of claim 1, wherein the first data packet is detected based on an application of a retroactive interference cancellation (RIC) to the first data sequence and the second data packet.

3. The method of claim 1, wherein the second data sequence includes a third data packet, and wherein the method further comprises:
   detecting the third data packet based on a successive interference cancellation (SIC) applied to the second data sequence.

4. The method of claim 1, further comprising:
   forgoing detection of the second data packet from the first data sequence based on the first detection being erroneous.

5. The method of claim 1, wherein the first data sequence is received from a second device, and wherein the method further comprises:
   determining, based on the first detection being erroneous, that a maximum number of transmissions has not been reached yet; and
   sending, to the second device, a first negative acknowledgment requesting a re-transmission of the first data packet.

6. The method of claim 5, further comprising:
   receiving, at a third time after the first time from the second device, a re-transmitted data sequence that includes the first data packet and the second data packet, the re-transmitted data sequence corresponding to a re-transmission of the first data sequence;
   generating a combined data sequence by at least combining the first data sequence and the re-transmitting data sequence;
   decoding the first data packet from the combined data sequence; and
   determining that the decoded first data packet is erroneous.

7. The method of claim 6, further comprising:
   determining, based on the decoded first data packet being erroneous, that the maximum number of transmissions has been reached; and
   sending, to the second device, a second negative acknowledgment requesting the first data packet to be dropped.

8. The method of claim 7, wherein the second data sequence is received based on the second negative acknowledgment, and wherein the second device is configured to exclude the first data packet from the second data sequence based on the second negative acknowledgment requesting the first data packet to be dropped.

9. The method of claim 6, further comprising:
   storing, in the memory buffer based on the decoded first data packet being erroneous, the re-transmitted data sequence as a second buffered data sequence; and
   storing a first set of channel coefficients associated with reception of the first data sequence and a second set of channel coefficients associated with reception of the re-transmitted data sequence.

10. The method of claim 9, wherein the first data packet is detected based on the first buffered data sequence, the second buffered data sequence, the first set of channel coefficients, the second set of channel coefficients, and the second data packet.

11. The method of claim 6, further comprising:
    determining a full correlation between the first data sequence and the re-transmitted data sequence based on each one of the first data sequence and the re-transmitted data sequence including the first data packet and the second data packet, wherein the combined data sequence is generated based on the full correlation.

12. The method of claim 1, further comprising:
determining a partial correlation between the first data sequence and the second data sequence based on the first data packet being included in the first data sequence and excluded from the second data sequence;
forgoing, based on the partial correlation, generating a combined data sequence that combined the first data sequence; and
determining that the second data packet is to be detected from the second data sequence based on the partial correlation.

13. The method of claim 1, further comprising:
storing, in the memory buffer, a plurality of data sequences each including a third data packet;
determining that detecting the third data packet has failed for a number of times that exceeds a maximum number of re-transmissions;
removing the plurality of data sequences from the memory buffer; and
dropping the third data packet.

14. A device comprising:
one or more processors; and
one or more memory storing instructions that, upon execution by the one or more processors, configure the device to:
receive, at a first time, a first data sequence that includes a first data packet and a second data packet;
determine that first detection of the first data packet from the first data sequence is erroneous;
store, in a memory buffer based on the first detection being erroneous, the first data sequence as a first buffered data sequence;
receive, at a second time, a second data sequence that includes the second data packet and that excludes the first data packet;
detect the second data packet from the second data sequence; and
perform a second detection of the first data packet based on the first buffered data sequence and the second data packet.

15. The device of claim 14, wherein the one or memory store further instructions that, upon execution by the one or more processors, configure the device to:
output, in real-time relative to reception of the second data sequence, the second data packet upon the second data packet being detected, and
output, in non-real-time relative to the reception of the second data sequence, the first data packet, wherein the first data packet is detected offline.

16. The device of claim 14, wherein the one or memory store further instructions that, upon execution by the one or more processors, configure the device to:
determine a correlation between the first buffered data sequence and the second data sequence based on usage of non-orthogonal multiplexing (NOM) associated with data sequence transmissions and an automatic repeat request (ARQ) process associated with data sequence reception.

17. A system comprising:
a first device that comprises one or more first processors and one or more first memory storing first instructions that, upon execution by the one or more first processors, configure the first device to:
receive, at a first time, a first data sequence that includes a first data packet and a second data packet;
determine that first detection of the first data packet from the first data sequence is erroneous;
store, in a memory buffer based on the first detection being erroneous, the first data sequence as a first buffered data sequence;
receive, at a second time, a second data sequence that includes the second data packet and that excludes the first data packet;
detect the second data packet from the second data sequence; and
perform a second detection of the first data packet based on the first buffered data sequence and the second data packet.

18. The system of claim 17, wherein the one or more first memory store further instructions that, upon execution by the one or more first processors, further configure the first device to:
determine, based on the first detection being erroneous, that a maximum number of transmissions has been reached; and
send, to a second device, a negative acknowledgment requesting the first data packet to be dropped.

19. The system of claim 18, further comprising:
the second device that comprises one or more second processors and one or more second memory storing second instructions that, upon execution by the one or more second processors, configure the second device to:
drop the first data packet from re-transmission based on the negative acknowledgment.

20. The system of claim 19, wherein the one or more second memory store additional instructions that, upon execution by the one or more second processors, further configure the second device to:
generate, based on the negative acknowledgment, the second data sequence by at least multiplexing a plurality of data packets, the plurality of data packets including the second data packet and a third data packet and excluding the first data packet.

* * * * *